Aug. 17, 1965     R. W. FROELICH     3,201,591
HORIZON DETECTION AND SCANNING SYSTEM
Filed Sept. 30, 1960     2 Sheets-Sheet 1
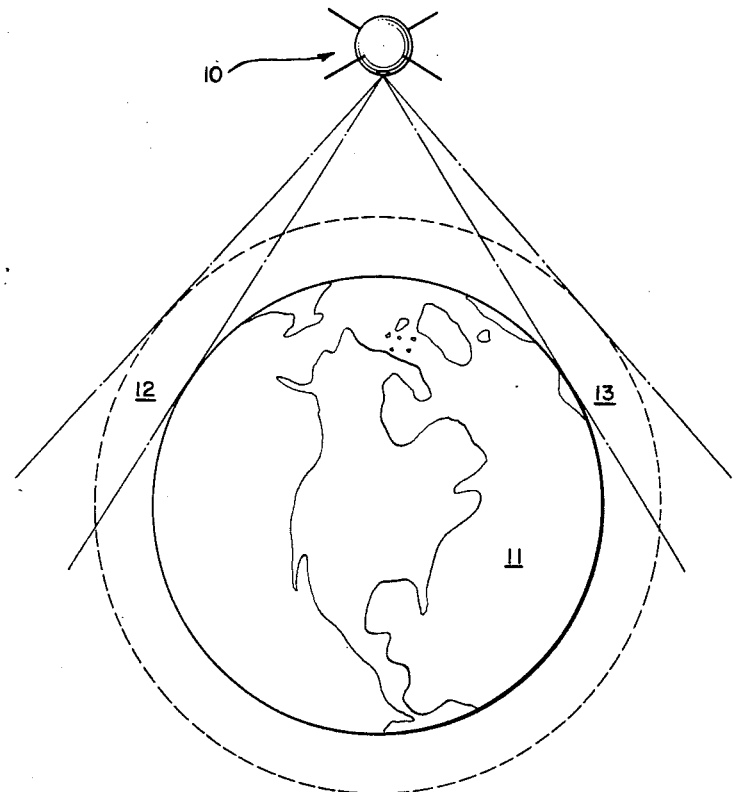
FIG. 1.
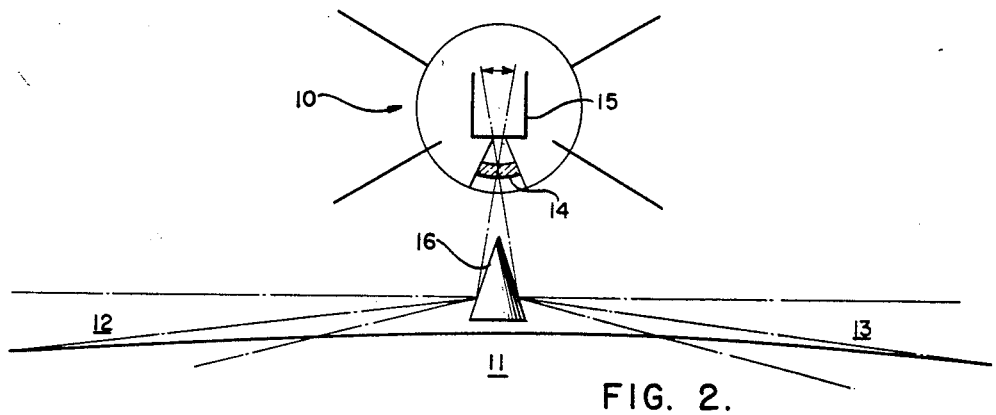
FIG. 2.
FIG. 3.
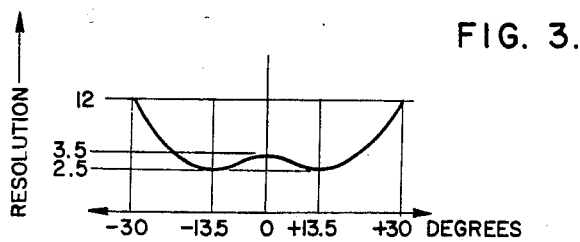
RONALD W. FROELICH
INVENTOR.
BY       AGENT
ATTORNEY Aug. 17, 1965  R. W. FROELICH  3,201,591
HORIZON DETECTION AND SCANNING SYSTEM
Filed Sept. 30, 1960  2 Sheets-Sheet 2
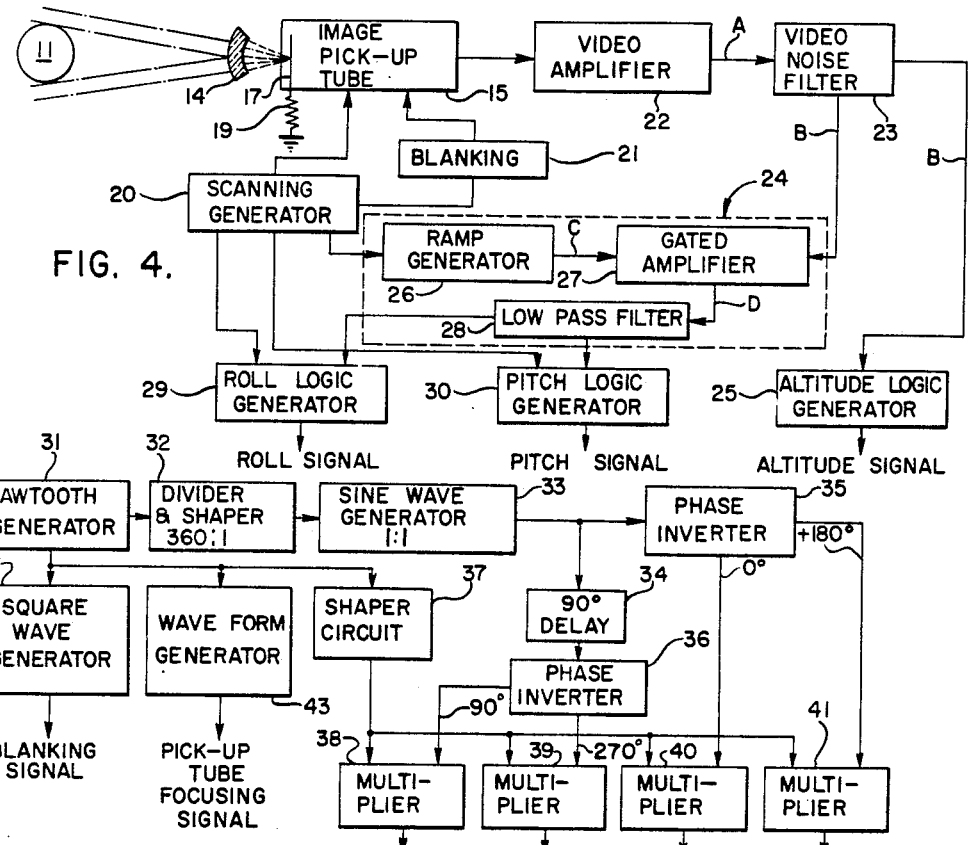
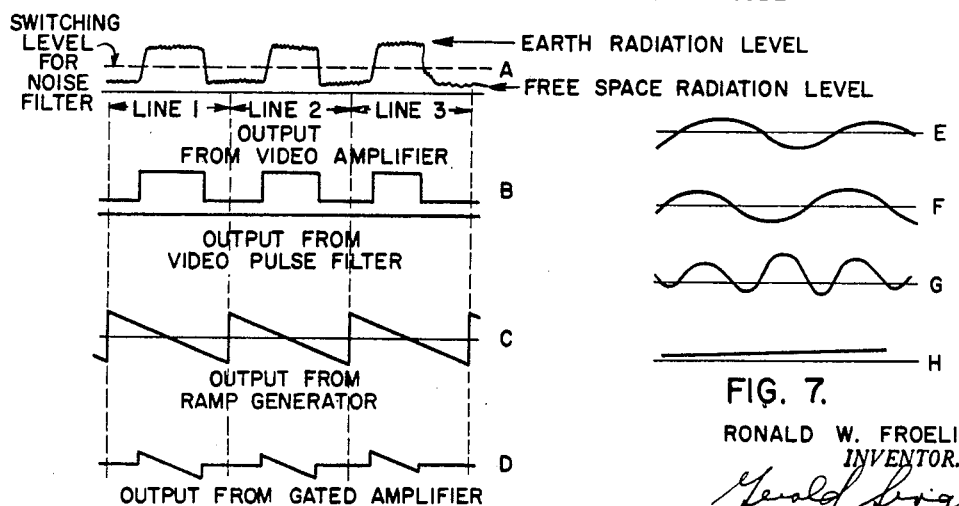
RONALD W. FROELICH
INVENTOR.
BY
AGENT
ATTORNEY

United States Patent Office 3,201,591
Patented Aug. 17, 1965

3,201,591
HORIZON DETECTION AND SCANNING
SYSTEM
Ronald W. Froelich, Gardena, Calif., assignor, by mesne assignments, to Thompson Ramo Wooldridge, Inc., Cleveland, Ohio., a corporation of Ohio
Filed Sept. 30, 1960, Ser. No. 59,770
3 Claims. (Cl. 250—83.3)

This invention relates generally to a detection and scanning system and more particularly to detection and scanning systems used with a horizon scanner.

In this invention there is disclosed a diametrical scanning system useful with electrostatic deflection cathode ray tubes for producing a display similar to that obtained by a planned position indicator (PPI), but at twice the information rate. The disclosed diametrical scanning system may be used in applications wherein a signal pattern representing the desired information is stored on a suitable signal storing surface. The scanning means associated with the signal storing surface scans the storing surface along a plurality of paths, each defining a diameter of the storing surface. Each path is angularly displaced from the previous path by a given amount, for example one degree, until the storing surface is completely scanned.

Systems using diametrical scanning techniques have great utility in the control and orientation of satellites after they have been placed in orbit. One specific application for such a horizon scanner is to sense the attitude of a communication satellite with respect to the planet it is orbiting and to send command signals of pitch and roll to the attitude control system of the satellite. It will be appreciated that once this information is determined and reduced to a signal, that the signal may be telemetered to control stations on earth for initiating error correction signals or transmitted directly to the attitude control system of the vehicle for repositioning the satellite directly as it deviates from a given normal position. Since any attitude control system located in a satellite must of necessity operate from a limited power source, it is most important that maximum output information be obtained from the limited power source available. The disclosed diametric scanning system used with a horizon scanning system in a satellite has the following claimed advantages:

(1) A scan is produced completely electronically without the need for rotating or mechanical components;
(2) Maximum use is made of information read out from the storing surface;
(3) Sampling is accomplished at two interfaces of earth and space for each diametrical scan line thereby yielding read out information at a line, not frame rate;
(4) Sampling of two interfaces between earth and free space on diagonally opposite sides of the earth cancels out gross thermal differences existing across the surface of the earth between the equator and poles; and
(5) Only line rate information need be transmitted back to earth for reconstruction of the picture of the earth viewed from the satellite.

The particular embodiment disclosed is an infrared detecting device using an infrared optical system for the collecting and focusing of the long wavelengths of infrared energy radiated by the earth, onto an infrared sensitive mosaic storage surface located in the image pickup tube. The optical system of the radiation sensing device is mounted to face in the direction of the planet (Earth) being observed when the required orientation exists between the satellite and the planet. A study of the radiation pattern emitted from earth discloses an atmosphere heavily saturated with water. It has been determined that the saturated atmosphere surrounding earth absorbs infrared energy in substantially two bands, the first covering wavelengths from 3 to 5 microns, while the second covering wavelengths from 8 to 11 microns. In order to reduce confusion between the earth and the sun, which also radiates energy at all wavelengths, the optical system has been chosen to pass radiation only in the far infrared spectrum, rather than in the visible spectrum where solar radiation is peaked. The viewing angle of the optical system (lens) is wide enough at the altitude of the orbiting satellite to completely focus the earth image on the storage surface of the tube. At operating altitude the entire horizon of earth, from horizon to horizon, then appears as a warm disc against cold free space.

As the description of the invention progresses the importance of the diametric scanning system in sensing the relative position between the satellite and earth will be demonstrated.

Further objects and advantages of this invention will be made as the description progresses, reference now being made to the accompanying drawings wherein:

FIG. 1 illustrates a high altitude satellite application of the horizon scanner;

FIG. 2 illustrates a low altitude satellite application of the horizon scanner;

FIG. 3 is a curve of the desired resolution obtained by selectively grinding the optical lens member;

FIG. 4 is a block diagram of the complete system illustrating how the altitude, pitch and roll signal voltages are obtained;

FIG. 5 is a block diagram of the scanning generator shown in FIG. 4, illustrating how the individual deflection voltages for the electrostatic imaging pickup tube are obtained;

FIG. 6 is a series of curves illustrating the waveforms obtained from the block diagram illustrated in FIG. 4; and FIG. 7 is a series of curves illustrating the waveforms obtained from the block diagram illustrated in FIG. 5.

Referring now to FIG. 1 there is shown a satellite 10 in a high altitude orbit about a planet 11. The satellite 10 is stabilized with respect to planet 11 by means of a horizon scanner located on the satellite and used to detect the local vertical direction between the satellite and the planet. The horizon scanner contained within the satellite 10 actually compares the discontinuity in radiation occurring between the horizon of the planet and that of cold free space. In the present application the planet 11 is that of earth which carries with it a relatively heavy water ladened atmosphere that has a strong infrared radiation absorption band in the 8 to 11 micron region. This absorption band results in a sharp interface discontinuity between free space and earth when viewed from free space. By detecting this radiation from a horizon 12 to a horizon 13 it is possible for the horizon scanner within the satellite 10 to generate signals in response to any deviation of the satellite from a vertical position. It is also contemplated that for special applications, different attitudes of the satellite 10 with respect to the earth 11 may be required. It is therefore within the scope of this invention to have the horizon scanner generate the proper control signals for obtaining any attitude for the satellite 10 once the local vertical position of the satellite is established with respect to the planet 11, providing, of course, that the new attitude is within the view of the optical lens system.

Referring now to FIG. 2 there is illustrated a low altitude application of the satellite 10 with respect to the planet 11. In low altitude applications it is still necessary for the satellite 10 to be vertically oriented with respect to the planet 11. However, the problem is now complicated, since it is necessary for the viewing scanner to obtain at least a 180 degree viewing angle in order to see the opposite horizons 12 and 13 on the planet 11. A germanium lens 14 is located in front of an image pickup tube 15 having a viewing angle of approximately 120 degrees. A complete 180 degree viewing angle is obtained by locating a suitably shaped object, in the form of a cone 16 having an apex centrally located with respect to the germanium lens 14, so as to bisect the 120 degree viewing angle. The cone 16 has an apex angle of 60 degrees which allows both horizons 12 and 13 to be viewed. The cone 16 may actually be a three-sided surface or have any other surface shape sufficient to reflect the proper image back to the germanium lens 14. It will be appreciated, therefore, that the reflection seen by the germanium lens 14 from the horizon 12 to the horizon 13 will actually be a ring of radiation about the planet 11.

Referring now to FIG. 3 there is shown a graph illustrating the preferred resolution of the germanium lens 14 for the application of the satellite 10 circling the planet 11. For any given application, the predicted altitude of the satellite will determine the lens circle of maximum resolution. Since the diameter of the planet 11 to be orbited is known, it is desirable to grind the germanium lens 14 in such a fashion so as to have improved resolution at those points along a circle corresponding to the planet horizons 12 and 13. In this manner, advantage is taken of the fact that the size of the object being viewed is known and hence the size of the image passed by the lens is known. It will be appreciated further that any deviation of the size of the image will therefore be an indication of the altitude of the satellite 10 above the planet 11.

Referring now to FIG. 4 there is shown a block diagram of the horizon scanner. In operation, the infrared radiation from the horizons 12 and 13 of the panel 11 are collected and focused by means of the germanium lens 14 onto an infrared sensitive mosaic surface 17 located within the image pickup tube 15. The image is focused on the infrared mosaic surface 17 by means of the germanium lens 14 located in front of the image pickup tube 15. The incremental resistance of any small area of the mosaic surface 17 is dependent upon the infrared temperature of the body whose image is focused on the mosaic. When the electron beam generated by the image pickup tube 15 impinges upon the mosaic surface 17, more or less beam current flows through the mosaic surface and consequently through a target load resistance 19 connected in circuit with said mosaic surface. In the operation of the image pickup tube 15 most of the electrons are gathered by the mosaic surface 17, however, some of the electrons are reflected back thereby allowing a secondary emission electron multiplier to be used as an integral part of the structure of the pickup tube 15. The function of the electron multiplier is to collect the electrons reflected from the mosaic surface 17 and amplify the number of electrons to a more useful level. The electron beam generated by the image pickup tube 15 electronically scans the mosaic surface 17 for obtaining both X and Y coordinate information, also called pitch and roll information. The addition of the electron multiplier within the image pickup tube 15 permits the use of a lower velocity electron beam and hence achieves a noticeable increase in the threshold signal to noise level over pickup tubes in which the signal is detected across a target load resistance in the mosaic circuit.

In an effort to obtain minimum current drain for the scanner system, electrostatic deflection electrodes utilizing the deflectron principles are used in the image pickup tube 15. The deflectron principle is a biaxial electrostatic-deflection principle which is more fully explained in a book entitled "Television Engineering Handbook," edited by Donald G. Fink published by McGraw-Hill Book Company, and specifically Chapter 6 in the First Edition. The diametrical scanning system disclosed in the present invention is defined as a scan moving along a plurality of paths each defining a diameter of the surface being scanned and in which each of said paths is displaced from each other until the complete 360 degrees of the surface have been scanned. This scanning system is actually moderately simple to produce and more easily yields horizon position information than any other type of scan system. The required scanning voltages to effect the diametrical scan are generated by a scanning generator 20 that drives the image pickup tube 15. The scanning generator 20 also sends a timing pulse to a blanking circuit 21 which in turn is connected to the image pickup tube 15 for turning off the electron beam and thus prevents an output signal during the retracing of the scanning beam. The video information from the image pickup tube 15 is directed to a video amplifier 22. The output signal from the video amplifier 22 is represented by curve A in FIG. 6 and is fed to a video noise filter 23. The output signal from the video amplifier 22 is predictable in advance and should represent a substantially square pulse. The time duration of the pulse is a measure of the time the electron beam is falling on the image of the earth formed on the mosaic surface 17 in the image pickup tube 15. The position of the pulse in time is a measure of where the electron beam detects the earth's radiation on the mosaic surface 17 and represents the planet being viewed. It is possible, therefore, to construct a filter network for filter 23 having the desired pass band characteristics which will develop a clean binary signal shown as waveshape B in FIG. 6. A deviation of the satellite from the proper attitude will cause the position of the pulse to move along the scan line which in turn can be decoded in suitable logic circuits and resolved into attitude pitch and roll error signals.

The video noise filter 23 is therefore used to remove noise from the video signal and develop a clean binary pulse from the video signal delivered by the video amplifier 22. The actual filter characteristics will of course be dependent upon the signal to noise ratio characteristics of the output signal from the video amplifier 22. Considering, for example, a situation in which the signal to noise ratio is 2 to 1 or higher from the video amplifier 22, then the signal may be used directly to trigger a suitable bistable flip-flop circuit. The output of the flip-flop is a square wave having front and trailing edges as shown by curve B in FIG. 6. The actual location of the front and trailing edges is dependent upon the individual path of the scanning line generating that video signal and the position of the warm image on the mosaic surface 17. In other words, the video noise filter 23 will generate a square wave voltage signal for every scan line that cuts the planet 11. The time duration of the square pulse will correspond to the time the earth is viewed by each scanned line, and the position of the pulse will be dependent upon where along the scan line the electron beam detects the image from the earth.

The output of the video noise filter 23 is fed to a line detector 24 and also to an altitude logic generator 25 which generates an altitude signal. The line detector 24 receives the square pulse B from the video noise filter 23 in order to determine the position of the planet 11 as represented by the positional relationship of the square wave B to the center of the scanned field of view for each line of scan. The line detector 24 is time based locked to the scanning frequency as evidenced by a control line from the scanning generator 20. The circuitry comprising line detector 24 may consist of a saw-toothed ramp generator 26 triggered by the scanning generator 20 and designed to generate a saw-toothed signal shown as reference C in FIG. 6. The saw-toothed ramp signal C is applied to a gated amplifier 27 having an ON duration controlled by the square wave output signal B generated by the video noise filter 23. The net effect produced by the gated amplifier 27 is to develop an output signal having a form shown as waveshape D in FIG. 6. The output of the gated amplifier 27 is fed to low pass filter 28 which smoothes the output from the gated amplifier 27 into a smooth, filtered voltage varying at the same low frequency frame rate as the scanning signal shown as waveshape E in FIG. 7. The magnitude of this signal E is dependent upon the magnitude of attitude positional error while the phase is an angular measurement of the axis along which the attitude error exists.

The altitude logic generator 25 receives the square video pulse waveform B in FIG. 6 from the video noise filter 23 and develops an altitude signal. The altitude logic generator 25 measures the time duration of the square wave pulse from the video noise filter 23 which is a measure of the time duration of the pulse from the horizon 12 to the horizon 13 of the planet 11. Since all the factors are known to determine the physical image of the planet 11 for any altitude, it is a simple matter to determine the exact altitude of the satellite. The circuitry of the altiude logic generaor 25 may consist of a wave rectifier connected to an RC load powered by the square wave output voltage from the video noise filter 23. The average voltage on the capacitor filtering the rectified output signal would be directly proportional to the altitude of the satellite and hence would be the altitude signal.

The output from the line detector 24, and specifically from the low pass filter 28, is fed to a roll logic generator 29 and a pitch logic generator 30. The roll logic generator 29 may consist of a simple two-phase synchronous detector excited by a 0 and 180 degree sine wave voltage as shown by waveform F in FIG. 7. These signals may, in fact, be generated by the scanning generator 20. The output of the synchronous detectors for both roll and pitch axes will be zero if the square wave generated by the video noise filter 23 occurs exactly in the center of the scan line, since the net voltage developed by the line detector 24 for this case will be zero. If the square wave output B from the video noise filter 23 should occur at any place other than the center of the scanned line, the synchronous detector will have an output signal as shown as waveshape G in FIG. 7 unless waveshape E is exactly 90 degree out-of-phase with waveshape F, in which case the output is zero. It can be seen therefore that waveshape G in FIG. 7 is the product of waveshapes E and F. This 90 degree out-of-phase case is a special situation in which the error exists only along the pitch axis while none exists in the roll axis. Finally, the output waveshape G is integrated or smoothed in a suitable passive RC circuit having a time constant longer than the rate of signal G to produce the attitude error signal illustrated as waveform H in FIG. 7.

The pitched logic generator 30 is electronically similar with that of the roll logic generator 29, the main difference being that the sine wave excitation signals applied to the synchronous detector in the pitch logic generator 30 are at 90 and 270 degrees rather than at 0 and 180 degrees as applied to the roll logic generator 29. The resultant net output signal from the roll logic generator 29 or the pitch logic generator 30 will be similar to that illustrated as waveform H in FIG. 7.

Referring now to FIG. 5 there is shown a more detailed block diagram illustrating the necessary circuit elements associated with the scanning generator 20 illustrated in FIG. 4. As mentioned previously, the scanning generator 20 must generate the proper phase and polarity of the saw-toothed sweep voltages in order to deflect the scanning beam associated with the image pickup tube 15. In the preferred embodiment, each diametrical scan line has a time duration of 3000 microscends and is angularly displaced one degree for a total of 360 degrees thereby producing a nominal frame rate of about one cycle per second. In theory the scanning signal can be generated by multiplying algebraically a saw-toothed high speed waveform and a lower frequency sinusoidal voltage. FIG. 5 illustrates how in practice the particular voltages may be generated for producing the defined diametric scan. A saw-tooth generator 31 is arranged to generate the time base saw-toothed voltage having a nominal 3000 microsecond period. This particular waveform generator has an ON time substantially longer than the OFF time. As is conventional in sweeping circuits, the OFF time is used to retrace the scanning beam. The output of the saw-toothed generator 31 is fed to a divider and shaper circuit 32. The divider and shaper circuit 32 produces the lower frequency by dividing down the input waveform by a factor of exactly 360 to 1 in suitable counter circuitry. A suitable counter stage would consist of one transistor and a memory core for determining the trigger point for the transistor. A 360 to 1 division is needed, since each scan line must be exactly one degree displaced from the previous line. By utilizing 360 diametric scans, the digital readout of information from the satellite back to earth is simplified by reducing the need for complex modulator and readout circuits. The output of the divider and shaper circuit 32 feeds a sine wave generator 33 having a 1 to 1 frequency ratio. The sine wave generator 33 generates a sine wave that is triggered and locked by the divider and shaper circuit 32 at exactly 1/360 of the line rate. The correct sweep voltages for the image pickup tube 15 (in FIG. 4) are produced by algebraically multiplying the proper phase relationship of the sine wave voltage produced by the sine wave generator 33 and the saw-toothed voltage produced by the saw-tooth generator 31. The proper phase relationships for the X and Y axes in the image pickup tube 15 are obtained by feeding the output of the sine wave generator 33 into a 90 degree delay network 34. The output of the 90 degree network 34 is a sine wave voltage equal in amplitude and frequency the output signal from the sine wave generator 33 but differing in phase by 90 degrees. The output of the sine wave generator 33 and the delay network 34 each feed phase inverters 35 and 36, respectively. Both phase inverters 35 and 36 are needed to generate the proper phased low-frequency sine wave voltages of 0 and 180, and 90 and 270 degrees. The saw-tooth generator 31 also feeds a shaper circuit 37 which in turn drives a series of multiplier stages 38, 39, 40 and 41. The outputs of phase inverter 36 are directed to multipliers 38 and 39, and in a similar manner the outputs of phase inverter 35 are directed to multipliers 40 and 41. The action of the individual multipliers 38, 39, 40, and 41 is to generate the proper X and Y deflection signals to be applied to the individual deflection plates of the image pickup tube 15.

The theory explaining the generation of the diametric scan is not involved when it is considered that if sine wave voltages alone were applied to the deflection plates of the image pickup tube 15, the resultant scan would be a circle having a diameter dependent upon the amplitude of the applied waveform. The position of the center of the circle would be dependent upon the steady state D.C. voltage existing between the paired deflection electrodes in the image pickup tube. If a ramp or saw-tooth voltage is applied to the deflection electrodes, the resulting trace would be a straight line traveling at a uniform rate across the surface of the image tube. Since the trace required is neither a circle nor a line as is commonly applied to display tubes from scanning circuits, but a combination of both, it is necessary that each sine wave must be multiplied algebraically with the saw-toothed voltage in a multiplier. Since four voltages must be generated, one for each of the deflection electrodes, four multipliers are used in the system.

The saw-tooth generator 31 also controls a nonsymmetrical square wave generator 42 which generates a substantially flat, nonsymmetrical, square wave blanking signal operating at the line frequency and having sufficient amplitude to turn off the electron scanning beam during retrace. The saw-tooth generator 31 also controls a waveform generator 43 which generates a substantially parabolic voltage at the scan line frequency. This voltage is needed to correct for beam landing errors in the image pickup tube and is applied to the focus electrode in the tube. These errors are well known in the art and are due to the use of flat tube faceplates. The exact voltage required is a function of the particular image pickup tube used.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined in the appended claims.

What is claimed is:

1. A device for measuring the horizon of an object having a peripheral surface adapted to radiate a substantially circular symmetric band of electromagnetic energy, an image pickup tube having an image storing surface for detecting and storing said energy in the form of a stored circular pattern, scanning means for scanning said storing surface along a plurality of paths each defining a diameter of said storing surface, said stored energy being stored substantially in the centermost portion of said storing surface, each of said paths being displaced from each other about the center of said image storing surface for effecting a scan of said entire storing surface, means cooperating with said scanning means for generating an output signal for each scan in response to said stored image, means for measuring the time duration of said output signal, means for generating a continuous signal varying as the time duration of said output signal varies whereby said signal represents the continuous measure of distance between said object and said storing surface, means for detecting the position of said output signal relative to each scan, each of said output signals being indicative of the exact location of said stored circular pattern with respect to the center of said image storing surface, and means for generating continuous signals varying as the position of the output signal varies with respect to each scan to thereby indicate roll and pitch information of said storing surface with respect to said object.

2. A horizon measuring device comprising means for sensing radiating energy from an object, means for storing a substantially circular symmetric image of said radiating energy in the form of a stored circular pattern substantially in the centermost portion of a thermal-sensitive storing surface, means for scanning said surface along a plurality of paths each defining a diameter of said surface, means for angularly displacing each of said diameters from each other for scanning said entire surface, means cooperating with said scanning means for generating an output signal for each scan in response to said stored image, means for generating a continuous signal varying as the time duration of said output signal varies whereby said signal represents the continuous measure of distance between said object and said storing surface, means for detecting the position of said output signal relative to each scan, each of said output signals being indicative of the exact location of said stored circular pattern with respect to the center of said image storing surface, and means for generating continuous signals varying as the position of the output signal varies with respect to each scan to thereby indicate roll and pitch information of said storing surface with respect to said object.

3. In a space vehicle arranged to orbit the planet earth a horizon scanner comprising, means for detecting substantially circular symmetric electromagnetic energy from said planet, an image pickup tube having an image storing surface for detecting and storing said energy in the form of a stored circular pattern substantially in the centermost portion of said storing surface, scanning means for scanning said storing surface along a plurality of paths each defining a diameter of said storing surface, each of said paths being displaced from each other about the center of said image storing surface for effecting a scan of said entire storing surface, means cooperating with said scanning means for generating an output signal for each scan in response to said stored image, each of said output signals being indicative of the exact location of said stored circular pattern with respect to the center of said image storing surface, means for measuring the time duration of said output signal, means for generating a continuous signal varying as the time duration of said output signal varies whereby said signal represents the continuous measure of distance between said object and said storing surface, means for detecting the postion of said output signal relative to each scan, and means for generating continuous signals varying as the postion of the output signal varies with respect to each scan to thereby indicate roll and pitch information of said storing surface with respect to said object.

References Cited by the Examiner

UNITED STATES PATENTS

| | | | |
|---|---|---|---|
| 2,234,328 | 3/41 | Wolff | 343—17 |
| 2,241,809 | 5/41 | De Forest | 315—24 |
| 2,698,433 | 12/54 | Ringoen | 250—203 X |
| 2,761,089 | 8/56 | Haeff | 343—17 |
| 2,986,637 | 5/61 | Null | 250—83.3 |
| 2,966,591 | 12/60 | McCartney | 250—203 |
| 3,020,407 | 2/62 | Merlen | 250—83.3 |
| 3,038,077 | 6/62 | Gillespie et al. | 250—83.3 |
| 3,082,324 | 3/63 | Schuck | 250—83.3 |
| 3,120,578 | 2/64 | Potter et al. | 250—203 X |

OTHER REFERENCES

Scientific Uses of Earth Satellites, W. G. Stroud and W. Nordberg, 1956, The University of Michigan Press, pp. 125–131 relied on.

RALPH G. NILSON, *Primary Examiner.*

CHESTER L. JUSTUS, ARCHIE R. BORCHELT,
*Examiners.*